United States Patent [19]

Clarke et al.

[11] Patent Number: 5,148,578
[45] Date of Patent: Sep. 22, 1992

[54] CORD LOCK DEVICE

[75] Inventors: Martin D. H. Clarke, Aurora; Ronald M. Davis, Unionville, both of Canada

[73] Assignee: ITW Plastiglide, Concord, Canada

[21] Appl. No.: 661,971

[22] Filed: Feb. 28, 1991

[30] Foreign Application Priority Data

Feb. 28, 1990 [CA] Canada ................... 2011200

[51] Int. Cl.⁵ .............................. A41B 7/00
[52] U.S. Cl. ................................ 24/41; 24/43
[58] Field of Search ............... 24/41, 42, 43, 44, 45, 24/46, 47, 48, 132 WL, 133, 136 L, 129 A; 7/123, 169

[56] References Cited

U.S. PATENT DOCUMENTS

| | | | |
|---|---|---|---|
| 506,778 | 10/1893 | Gronberg | 24/41 |
| 644,894 | 3/1900 | Carlin | 24/43 |
| 729,769 | 6/1903 | Jenkins | 24/45 |
| 924,425 | 6/1909 | Burnard | 24/133 |
| 4,005,509 | 2/1977 | Verdina et al. | 24/133 |

FOREIGN PATENT DOCUMENTS 0001605 of 1913 United Kingdom ............ 24/42

*Primary Examiner*—Victor N. Sakran
*Attorney, Agent, or Firm*—Schwartz & Weinrieb

[57] ABSTRACT

Disclosed is a cord lock device for use in connection with wearing apparel comprising an integrally molded housing including a back support securely connectible to the wearing apparel by means such as, for example stitching. The housing is adapted to receive a pivotally biased cam lock member having a release lever or button. In use, one end of a cord is securely fastened to the back support of the device or to the apparel and the free end of the cord is threaded through the housing adjacent the cam lock member and is positioned for selective pulling, the cord portion defined between the one and free ends of the cord defining a cord loop. The cord loop is sewn into the material of the apparel so that when the free end of the cord is pulled, the material is pulled into close contact with the adjacent part of the body. The preferred location of the device is at the cuffs of a jacket or pants so that they may be pulled about the wrists or legs of the wearer.

20 Claims, 4 Drawing Sheets

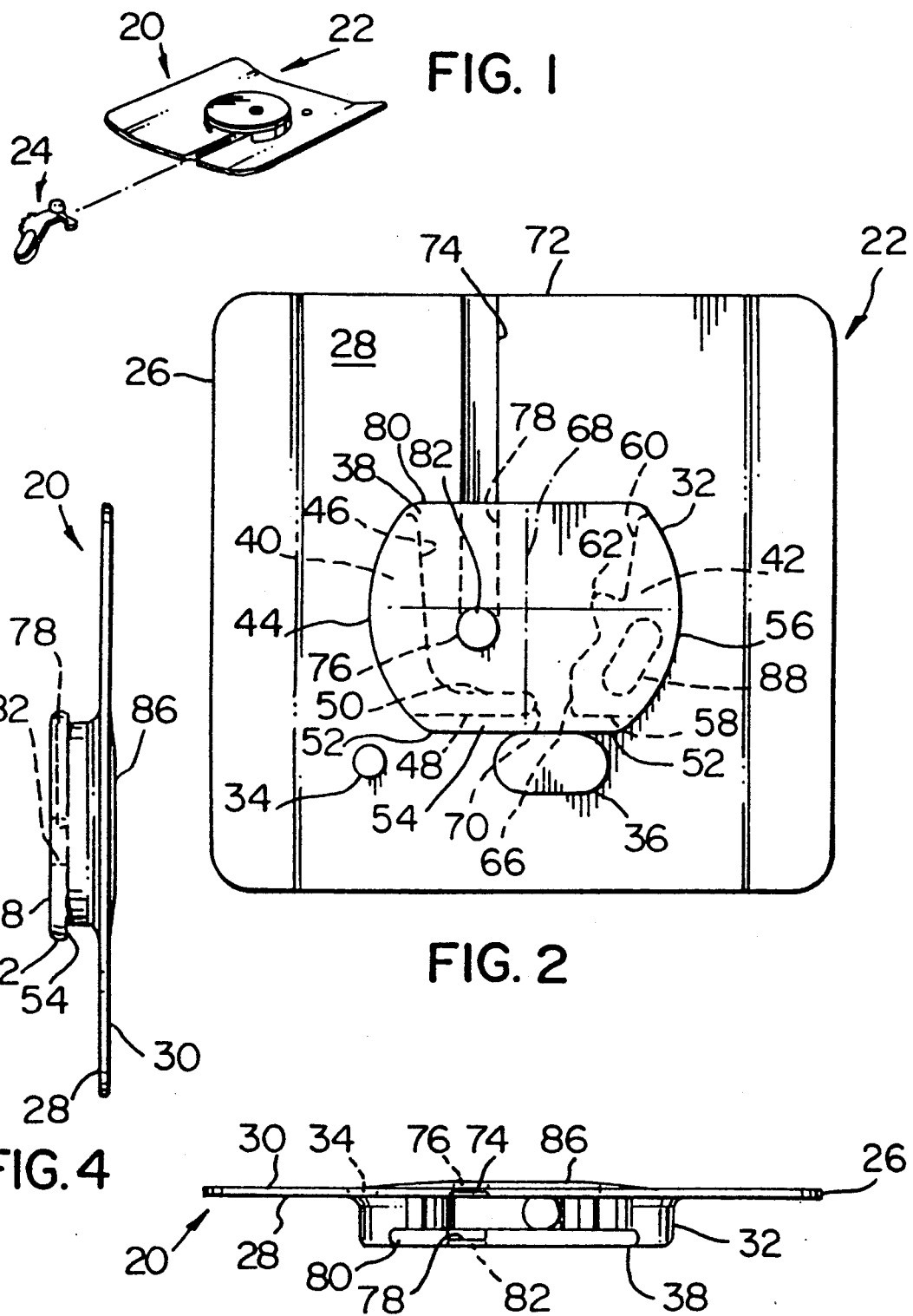

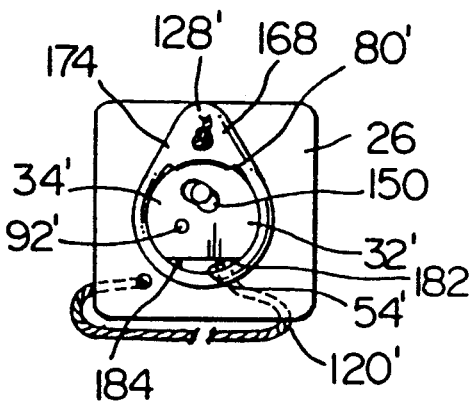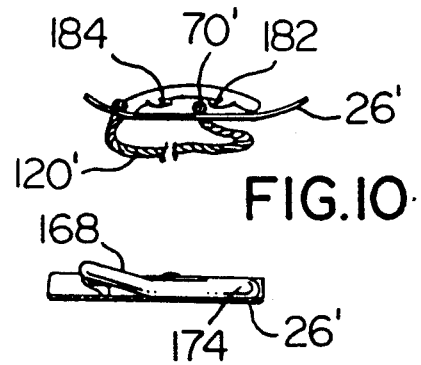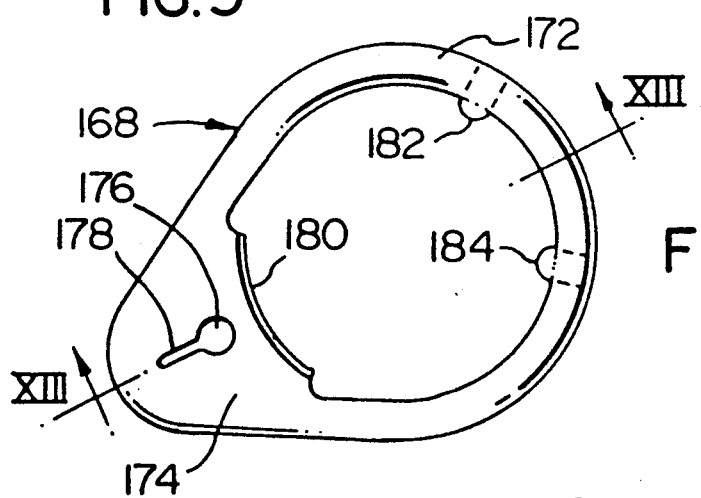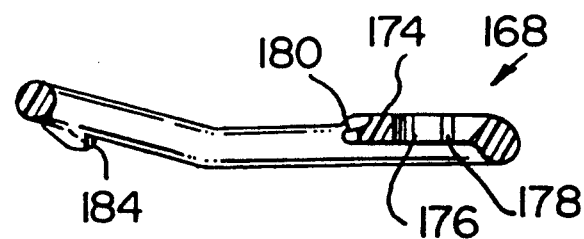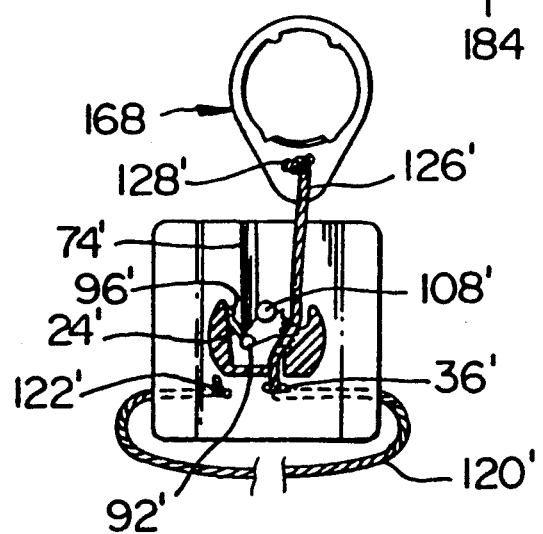

CORD LOCK DEVICE

FIELD OF THE INVENTION

This invention relates generally to a cord lock device and more particularly to a cord lock device adapted for incorporation into wearing apparel such as, for example, a cuff and operative association with a cord which when selectively pulled will substantially close the cuff so as to protect the wear against unfavorable environmental elements.

BACKGROUND OF THE INVENTION

Wearing apparel such as, for example, winter jackets often have elasticized or knitted cuffs to reduce or eliminate the entry of cold air into the associated sleeve or the leakage of warmer air out from the sleeves. Elasticized or knitted jacket waistbands are often used for similar purposes. Winter pants may also have leg cuffs formed from similar materials for similar purposes.

Winter wearing apparel which incorporate buoyancy material has particular utility in marine applications such as, for example, with fishermen of the seas and oceans in northern climes. Such equipment in the form of jackets, pants or full suits often include a closure system so that the cuffs and waist area of the clothing or apparel may be tightened around the wrists, legs or waist of the wearer so as to maintain body heat within the apparel and restrict or eliminate the entry of cold air or water into the sleeves and legs of the apparel. This is particularly important if the wearer happens to fall overboard, as the ability to quickly and effectively close off these areas has proven invaluable in connection with the significant reduction in the dissipation of heat from the body and the onset of hypothermia.

Known means of positively closing off the areas of the cuffs include a VELCRO ® type of fastener system which comprises a strap reversed in direction about a buckle. However, some difficulty has been encountered by some people in locating the cooperating VELCRO ® strips. Furthermore, the strips are subject to accidental release through means of contact with objects or the continued movement of water about the system.

In providing a locking system, it is also desirable that the mechanism not be exposed upon external surfaces of marine work suits. Any exposed device or tabs are prone to being caught upon nets or the like and possibly causing a worker to be pulled overboard or at the least, causing damage to the worker or his/her suit.

Accordingly, there is a need for a more positive locking system which is simple and quickly operable, which will not release without positive action, and wherein the mechanism or tabs are not exposed upon exterior surfaces.

SUMMARY OF THE INVENTION

The present invention briefly pertains to a cord lock device comprising an integrally molded housing including a back support securely connectible to the wearing apparel by means such as, for example, stitching. The housing is adapted to receive a pivotally biased cam lock member having a release lever or button. In use, one end of a cord is securely fastened to the back support of the device or to the apparel and the free end of the cord is threaded through the housing adjacent the cam lock member and positioned for selective pulling by means of the wearer when desired. A cord loop is defined between the one and free ends of the cord so as to encircle a portion of the apparel and body portion of the wearer when the apparel is worn by the wearer, and the cord loop is sewn into the material of the apparel so that when the free end of the cord is pulled, the material is pulled into close contact with the associated part of the body. The preferred location of the device is at the cuffs of a jacket or pants so that they may be pulled about the wrists or legs of the wearer when desired or required.

BRIEF DESCRIPTION OF THE DRAWINGS

Various other objects, features, and attendant advantages of the present invention will become more fully appreciated from the following detailed description, when considered in connection with the accompanying drawings, in which like reference characters designate like or corresponding parts throughout the several views, and wherein:

FIG. 1 is an exploded perspective view of one embodiment of the present invention showing the housing and spring lock cam.

FIG. 2 is a plan view of the housing.

FIG. 3 is an end view of the housing taken from the upper end of the housing as shown in FIG. 2.

FIG. 4 is a left side view of the housing of FIG. 2.

FIG. 9 is a plan view of the modified embodiment of FIG. 8 with the pull ring connected to the housing.

FIGS. 10 and 11 are rear and side elevational views of the device of FIG. 9.

FIGS. 12 and 13 are enlarged plan and sectional views of the pull ring of the embodiment of FIGS. 8 and 9.

FIG. 14 is a view partially in section showing a cord in operative association with the device of FIGS. 8 and 9.

DESCRIPTION OF THE ILLUSTRATED EMBODIMENTS

Figure 5:
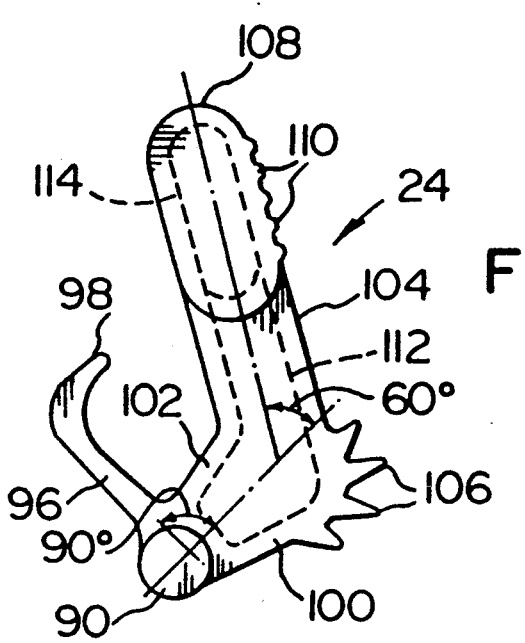
FIG. 5 is an enlarged plan view of the spring lock cam.

Referring now to FIGS. 1–4, there is provided a cord lock device 20 comprising a housing portion 22 and a spring cam lock 24. Housing 22, as seen in FIGS. 2 and 3, has a thin backing or support section 26 of generally squarish configuration having opposed surfaces 28 and 30. Extending outwardly from surface 28 of back 26 is integrally molded housing 32. Circular aperture 34 and oval aperture 36 extend through backing 26 from the back side to the front side.

Housing 32 includes cover 38 having supporting sections 40 and 42 which together have a generally U-shaped configuration. Section 40 itself is generally L-shaped in cross-section with convex outer surface 44 and slightly sloping inner planar surface 46 defining one leg of the section 40. Outer base surface 48 and inner base surface 50 define the foot or other leg of section 40. Surface 48 is parallel to but inward of edge 52 of cover 38 defining a lip 54 therebetween. Section 42 comprises outer convex side surface 56 which is of a similar curvature as that of convex surface 44 and outer base surface 58 which is parallel with respect to surface 48 and which thus also defines lip 54. Inner surface 60 slopes inwardly like in a manner similar to that of surface 46 and has tooth 62 projecting inwardly for reasons more specifically set forth hereinafter. Surface 66 is aligned with aperture 70 which is preferably circular and defined between the base portions of sections 40 and 42. Aperture 70 is offset with respect to the centerline 68 of housing 32.

Extending inwardly from edge 72 of backing 26 is groove 74 which extends toward circular aperture 76 defined within backing 26 as seen in FIGS. 2 and 3. A similar width groove 78 is aligned with groove 74 and extends inwardly from edge 80 of cover 38 toward aperture 82 which is aligned with aperture 76 (FIGS. 2 and 3).

FIGS. 3 and 4 show the back surface 30 of the device 20 having a thickened reinforcing area 86 particularly within the area of aperture 76.

Aperture 88 (FIG. 2) is formed for molding purposes and in addition to lightening the weight of the cord lock device, it eliminates the tendency of plastic dimpling due to contraction of the section 42.

Figure 6:
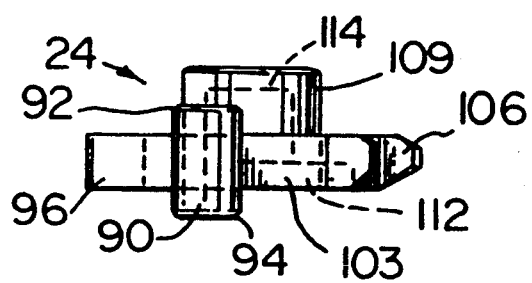
FIG. 6 is an end view of the cam of FIG. 5 taken from the bottom of FIG. 5.
Figure 8:
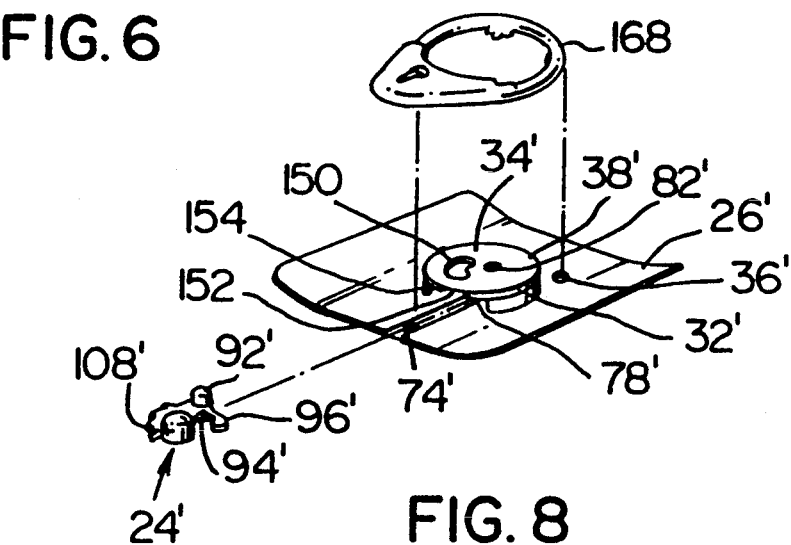
FIG. 8 is an exploded perspective view of a modified embodiment of the present invention.

FIGS. 5 and 6 illustrate the integrally molded spring cam lock 24 comprising solid pivot 90 with opposing pivot ends 92, 94. Biasing arm 96 extends outwardly from the pivot 90 and has inwardly curving free end 98. Also extending outwardly from the pivot 90 is lever arm 100 comprising base latch portion 102 and release arm portion 104. Base latch portion 102 extends at an angle of approximately 90° with respect to arm 96 and has a plurality of teeth 106, four being shown. As shown in FIG. 6, teeth 106 have upper and lower chamfered portions as best seen in side view. Release arm portion 104 extends at an angle of approximately 60° with respect to the direction of base portion 102. Arm portion 104 has a finger or thumb engagement end 108 with contact ribs 110 formed thereon. FIGS. 5 and 6 show in dotted lines, recesses 112 and 114 which are molded into cam lock 24 for weight reasons and to avoid dimpling due to contraction of the plastic material within the base and arm portions.

In assembling cam lock 24 to housing 22, pivot ends 92 and 94 are aligned with grooves 74 and 78 respectively. The distance between the ends 92 and 94 of pivot 90 and the bottom of grooves 74, 78 is such that the pivot may be pushed inwardly along the grooves with the cover 38 and backing 26 flexing sufficiently so that when the ends 92, 94 reach the respectively aligned apertures 76 and 82, the pivot ends snap engage into the respective apertures so as to securely but pivotally locate the cam lock 24 within housing 32.

Figure 7:
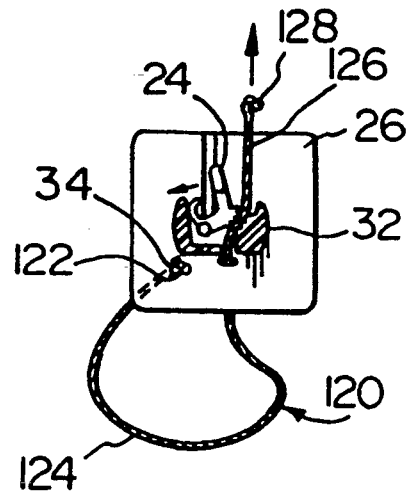
FIG. 7 is a view partially in section showing the lock device in operative association with a cord.

FIG. 7 shows the cord lock of FIGS. 1-6 in assembly with housing 32. Cord 120 has an enlarged end 122 (knotted or swelled by means of heat) secured within aperture 34. Cord 120 includes loop portion 124 and free end 126 which end is fed upwardly through aperture 36 and, through aperture 70 so as to be confronted by means of surface 66 and teeth 62 and 106. The end 126 is enlarged by means of a knot or the like 128 after assembly. As noted further hereinafter, the end can be detachably secured to the inside of an apparel cuff.

In use, the backing 26 is sewn into the cuff area (not shown) of a garment (such as, for example, an arm or leg) with the loop 124 sewn within the cuff. If the wearer of the suit falls overboard or is in extremely inclement weather, he/she can pull the free end 126 of the cord 120 and this will gather the material closely about the wrist or ankle so as to prevent the ingress of air and/or water into the suit. Biasing arm 96 acting against surface 46 biases lock cam 24 so that teeth 62 and 106 cooperate in locking cord 120 immediately against withdrawal. Only upon actuation of lever arm 104 against the biasing force of arm 96 may cord 120 be released from the cooperating teeth so as to thereby allow the cuff to be manually expanded to its normal condition.

The locking is positive, quick and cannot be released unless lever arm 104 is actuated.

A modified embodiment of the present invention is shown in FIGS. 8-14 wherein like elements are designated with a prime ('). Backing 26' incorporates housing 32' which is generally of similar design as that of housing 32 with two exceptions—one is the curvilinear aperture 150 within the cover 34' which is adapted to house in a reciprocating fashion a release button 108' of spring lock cam 24'. The other is the curvilinear groove 152 which is defined within the inside surface 154 of top 38' which groove accommodates the curved end of button 108' when the cam lock 24' is being assembled within housing 32'.

In assembling the cam lock 24', pivot ends 92', 94' are located within the opposed aligned grooves 74', 78' and button 108' is aligned with groove 152. The flexibility of the material of the cover 32' and backing 26' is such that the pivot pins 92', 94' snap into position within aligned apertures 76', 82' and button 108' snaps into position within aperture 150. Finger or thumb movement of button 108' allows for release of the spring lock cam 24'.

Associated with housing 32' in accordance with this embodiment is a snap or pull ring 168 which is shown in further detail in FIGS. 9-14. Pull ring 168 comprises ring portion 172 which has a similar curvature as that of the sides of housing 32'. The front triangular portion 174 has an aperture 176 for securing the ring to the end 126' of cord 120' which is knotted or otherwise enlarged as shown at 128'. As shown, the "V"-shaped aperture 178 adjacent circular aperture 176 also provides a pinching action between the ring and the cord when the ring is pulled so as to further secure the pull ring to the cord.

Shoulder 180 and spaced tongues 182, 184 provide a detachable snap action connection between the ring 168 and housing 32'. Tongues 182, 184 fit beneath lip 54' whereas shoulder 180 fits within the opening defined beneath the front edge 80' of housing top 38'. Ring 168 is shaped such that (FIGS. 10 and 11) when assembled with housing 32', the part defined between tongues 182, 184 is raised sufficiently so as to expose housing aperture 70' through which cord 120' is threaded.

In use, backing 26' is sewn into the cuff area of a garment (such as, for example, an arm or leg) with the cord loop 124' sewn within the cuff.

The cord end 126' is knotted through aperture 176 with the cord pinched within slot 178. Ring 168 is located over housing 32' with tongues 182, 184 and shoulder 180 cooperating with lip 54' and edge 80' in a snap fit action. If the wearer is in very inclement weather or falls overboard, he would detach ring 168 from its snap association with housing 32' and pull on it so as to tighten the cord loop 124' which, sewn into a cuff, will thus tighten the cuff about the wrist or leg of the wearer. If the wearer is simply tightening the cuff while working on board in order to maintain body heat within the suit, pull rings 168 may be tucked into the cuff outwardly of the tightened portion and thus be out of the way. Cord lock 24' maintains the fit of the cuff about the wrist or ankle unless released by manually actuating release button 108' by means of one's thumb or finger.

Figure 15:
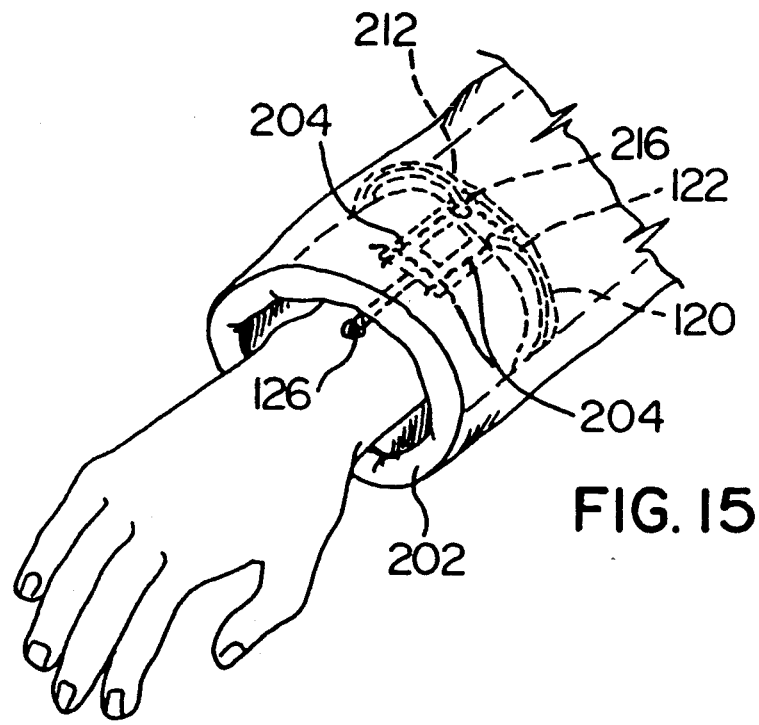
FIG. 15 is a perspective view of part of a cuff of a protective suit with the inventive device associated therewith.
Figure 16:
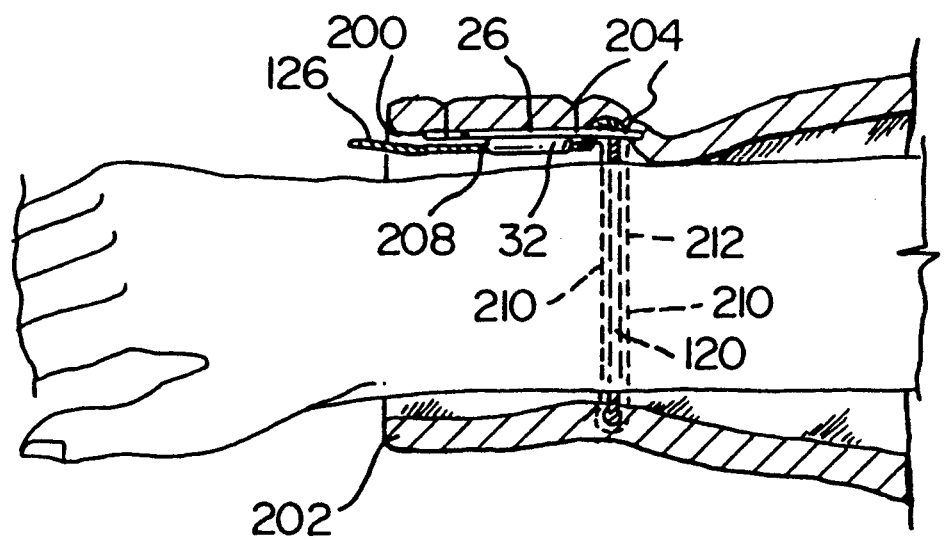
FIG. 16 is a side view, partly in section, of the cuff of FIG. 15 with the cord lock actuated.

FIGS. 15 and 16 moe particularly illustrate the use of the invention and depict an arm of the wearer in association with a protective suit in which the invention is installed. The backing 26 (or 26') is sewn into the material 200 of cuff 202 by means of stitching 204. The inner material 200 of cuff 202 has an aperture 208 through which housing 32 (or 32') extends. Cuff 202 may also have reinforcing material (not shown) to which backing 26 (or 26') is sewn. Adjacent aperture 208 is a stitched, peripheral passageway 210 defined by means of stitching 212, 214 provided about the cuff and through which cord 120 is threaded. Cord end 122 is secured to backing plate aperture 34 and free end 126 is passed through the lock device as previously described. Appropriate holes 216 are provided within the inner material of the passageway so as to permit the cord to exit and connect with the backing plate. During normal wear cuff 202 is loose enough that there is no difficulty in manipulating the fingers and thumb of a hand so as to grasp the end 126 or pull ring 168 from a position inside the cuff 202. End 126 could have a piece of material such as, for example, Velcro ® associated with it and in association with similar material sewn to the inside of the cuff, it could be detachably secured to the cuff.

A preferred material for the backing and housing is sewable plastic material such as, for example, nylon which will flex sufficiently so as to permit assembly of the cam lock to the housing and which can be pierced by means sewing needles. The cam lock may be of an acetal plastic.

Although we have described particularly preferred embodiments, it will be appreciated by those skilled in the art that variations and modifications of the invention are possible within the ambit of the claims herein which follow hereinafter.

The embodiments of the invention in which an exclusive property or privilege is claimed are defined as follows:

1. A cord lock device of plastic material for use in association with wearing apparel, comprising:
   backing means adapted to be secured to said wearing apparel;
   housing means integrally formed with said backing means, said housing means having opposed interior side surfaces, one of said side surfaces including a portion of said backing means, and said side surfaces having axially opposed pivot apertures, said housing having a cam surface and a confronting toothed surface;
   a cam lock having a pivot pin adapted for pivotal movement within said housing in association with said pivot apertures, said cam lock having a toothed portion confronting said toothed surface of said housing means and a biasing arm in contact with said cam surface of said housing means for pivotably biasing said cam lock about said pivot pin so as to bias said toothed portion of said cam lock toward said toothed surface of said housing means;
   said housing side surfaces being sufficiently flexible so as to permit said cam lock pivot pin to be forced through an opening defined within said housing means so as to achieve a snap fitted operative position with said pivot apertures of said housing means.

2. The device according to claim 1 wherein said housing means has a side wall opposed to said opening, said side wall being generally closed except for a hole defined therethrough which is adapted to receive and permit movement therethrough of cord material in association with which said cord lock device is used.

3. The device according to claim 2 wherein each one of said interior housing side surfaces has a groove extending from said housing opening to a respective one of said opposed pivot apertures, said grooves guiding translational movement of said pivot pin within said housing until said cam lock is in its operative, snap fitted position.

4. The device according to claim 2 or 3, wherein:
   said backing means has two apertures defined therein and disposed outside of said housing means, at least one of said two apertures being disposed closely adjacent to said hole defined within said closed side of said housing means.

5. The device according to claim 1, wherein:
   said cam lock includes a release lever arm which extends outwardly from said housing means opening, said lever arm being positioned for manual operation so as to move said cam lock against the biasing force of said biasing arm.

6. A cord lock device as set forth in claim 5, wherein:
   said toothed portion, said biasing arm, and said release lever arm of said cam lock comprises a one-piece plastic molding; and
   said biasing arm is disposed at an angle of approximately 90° with respect to said toothed portion of said cam lock, while said release lever arm is disposed at an angle of approximately 60° with respect to said toothed portion of said cam lock.

7. The device according to claim 1, wherein:
   said cam lock includes a laterally extending button, said housing means having an arcuate aperture defined within said side disposed opposite to said backing means, said arcuate aperture adapted to accommodate said button for translation movement therewithin, said opposite side of said housing means also having a groove defined upon its interior surface whereby said button is guided toward said arcuate aperture during assembly of said cam lock with said housing means.

8. The device according to claim 7 wherein there is a pull ring means having a loop portion, said loop portion being adapted for detachable snap fit engagement with said housing means wherein said loop portion generally encircles said housing means.

9. A cord lock device of plastic material, comprising:
   back plate means; and
   housing means integrally formed with said back plate means and extending laterally outwardly therefrom;
   said back plate means being adapted to be secured to wearing apparel; and
   a cam lock disposed within said housing means and having a toothed portion for cooperation with an inner wall of said housing means so as to provide a locking means for said device, said cam lock being biased into a locking position, and means for manually releasing said cam lock from said locking position;

said cam lock having pivot means adapted to cooperate with apertures defined within side surfaces of said housing means, at least one of said side surfaces having groove means extending from an open side of said housing means to a respective one of said apertures, each one of said groove means being sized and configured so as to permit translational movement of said cam lock pivot means and flexure of a respective side surface of said housing means whereby said cam lock pivot means will snap fit into said apertures after being guided by and passing along said respective groove means.

10. The device according to claim 9, wherein:

said back plate means is reinforced;

said reinforcement including additional material provided upon said back plate means within the vicinity of said aperture defined within said side surface of said housing means integrally formed with said back plate means.

11. A cord lock device as set forth in claim 9, wherein:

said means for manually releasing said cam lock from said locking position comprises a manually operable release button integrally formed upon said cam lock and movably disposed within a slot formed within said housing.

12. A cord lock device as set forth in claim 9, wherein:

said means for manually releasing said cam lock from said locking position comprises a manually operable release lever arm integrally formed upon said cam lock.

13. A cord lock device as set forth in claim 12, wherein:

said cam lock further comprises a biasing arm for biasing said cam lock toward said locking position; and said toothed portion, said biasing arm, and said release lever arm comprise a one-piece plastic molding with said biasing arm being disposed at an angle of approximately 90° with respect to said toother portion of said cam lock while said release lever arm is disposed at an angle of approximately 60° with respect to said toothed portion of said cam lock.

14. A cord lock device as set forth in claim 9, further comprising:

pull ring means having means defined thereon for securing said pull ring means to a free end portion of a locking cord to be used in connection with said cord lock device.

15. A cord lock device as set forth in claim 14, wherein:

said pull ring means has an annular configuration the diametrical extent of which is substantially equal to that of said housing means so as to facilitate snap engagement of said pull ring means upon said housing means when said locking cord is not being pulled in accordance with a locking operation.

16. In combination with wearing apparel having at least one cuff portion for use in association with a portion of the body of a wearer around which said cuff portion may be tightened, a cord lock device comprising a back portion secured within said cuff by stitching, a housing portion integrally formed with said back portion and extending inwardly of said cuff portion and accessible through inner material of said cuff portion, said housing portion having a cam lock pivotally mounted therein, said cam lock being biased into a locking position at which said cam lock is cooperative with an inner portion of said housing portion;

said cuff portion including a cord sewn within and about said cuff portion within a plane disposed generally perpendicular to a longitudinal axis of said cuff portion, said cord having one end secured to said back portion secured within said cuff portion, the other free end of said cord being threaded into and through said housing portion between said cam lock and said housing portion inner portion whereby said free end of said cord may be grasped by means of a hand of said wearer whereby pulling upon said free end of said cord causes said cuff portion to tighten about said body portion and be maintained at a tighten position by locking cooperation defined between said cam lock and said inner portion of said housing portion.

17. A cord lock device as set forth in claim 16, wherein said cam lock further comprises:

a toothed portion for lockingly cooperating with said inner portion of said housing portion; and a biasing arm for biasing said toothed portion toward said locking position at which said toothed portion cooperates with said inner portion of said housing portion.

18. A cord lock device as set forth in claim 17, wherein said cam lock further comprises:

a manual release lever arm for manually releasing said cam lock from said locking position, said release lever arm, said toothed portion, and said biasing arm comprising a one-piece plastic molding with said biasing arm being disposed at an angle of approximately 90° with respect to said toothed portion of said cam lock while said release lever arm is disposed at an angle of approximately 60° with respect to said toothed portion of said cam lock.

19. A cord lock device as set forth in claim 16, further comprising:

pull ring means having means defined thereon for securing said pull ring means to said free end portion of said cord.

20. A process of installing a releasable cord lock device within a cuff portion of a garment, comprising the steps of:

providing a cord lock device comprising a back plate and an integral housing, said housing having a releasably biased cam lock adapted to cooperate with said housing so as to provide a unidirectional locking passage for a locking cord passing through said housing;

securing said locking cord at one end thereof to said back plate, said locking cord having a free end;

forming said cuff portion of said garment so as to have an inner aperture defined therein and forming a peripherally defined passage about said cuff portion adjacent to said aperture;

locating said back plate within said cuff portion so that said housing extends inwardly with respect to said cuff portion through said inner aperture;

threading said free end of said locking cord through said passage of said cuff portion and through said housing locking passage; and securely sewing said backplate to said cuff portion of said garment.

* * * * *